United States Patent [19]
Mostrom

[11] Patent Number: 6,034,442
[45] Date of Patent: Mar. 7, 2000

[54] FRUSTRATOR—MODEL E

[76] Inventor: Lloyd C. Mostrom, 910 N. Montana St., Arlington, Va. 22205

[21] Appl. No.: 08/911,266

[22] Filed: Aug. 14, 1997

Related U.S. Application Data

[60] Provisional application No. 60/038,209, Feb. 18, 1997, provisional application No. 60/044,038, May 30, 1997, and provisional application No. 60/052,797, Jul. 8, 1997.

[51] Int. Cl.⁷ .................................................. B60R 25/00
[52] U.S. Cl. ............................ 307/10.2; 180/287; 70/252
[58] Field of Search .................................. 307/10.2–10.6; 180/287; 70/237, 252, 257, 183–186, 245, 247, 248

[56] References Cited

U.S. PATENT DOCUMENTS

| | | | |
|---|---|---|---|
| 4,562,710 | 1/1986 | Lipschütz | 70/252 |
| 5,654,689 | 8/1997 | Peyre et al. | 307/10.3 |
| 5,921,355 | 7/1999 | Mostrom | 70/252 |

*Primary Examiner*—Richard T. Elms

[57] ABSTRACT

The Frustrator Model E consists of a small unique claw-lever interacting with a toothed collar attached to the automobile steering rod to lock or unlock said steering rod, and activated by a simple arrangement of gears and levers powered by a bi-directional electric motor controlled by electric contacts on the ignition key core, all contained within the automobile steering column enclosure.

1 Claim, 3 Drawing Sheets

FRUSTRATOR— MODEL E

CROSS REFERENCE TO RELATED APPLICATIONS

Provisional Application Model C Nr 60/038,209 dtd Feb. 18, 1997

Provisional Application Model E Nr 60/044,038 dtd May 30, 1997

Provisional application Model F Nr 60/052,797 dtd Jul. 8, 1997

Patent Application Model C Nr 08/883,595 dtd Jun. 26, 1997, now U.S. Pat. No. 5,921,355.

STATEMENT REGARDING FEDERALLY SPONSORED RESEARCH

Not Applicable

REFERENCE TO MICROFICHE APPENDIX

Not Applicable

BACKGROUND OF THE INVENTION

This invention is in the utility field and in response to the growing frequency of automobile thefts It is designed to frustrate automobile thieves. This invention uses a unique steering rod collar/claw-lever lock combination activated by a simple mechanical linkage, gears and a bi-directional electric motor energized by two electrical contacts on the ignition key core.

BRIEF SUMMARY OF THE INVENTION

This device located entirely within the steering column enclosure uses a bidirectional electric motor energized by contacts on an ignition key core and operating through gears and a mechanical linkage to rotate a unique claw-lever lock to engage cogs on a steering rod collar and thus lock the steering rod, making it impossible to drive this automobile when the ignition key is turned to the "off" position to stop the automobile engine. When the ignition key is turned to the "on" position to start the automobile engine, the electric motor will be energized to turn in the opposite direction to rotate the claw lever to an alternate position where the steering rod is free to operate normally. A breaker switch in each of the energizing circuits will shut off the electric current when the claw lever reaches a predetermined position.

BRIEF DESCRIPTION OF THE SEVERAL VIEWS OF THE DRAWING

FIG. (1A) is an overall portrayal of the claw-lever lock assembly showing the ignition key core, electric conductors, bi-directional electric motor, gears, mechanical linkage, claw-lever, and steering rod collar with cogs.

FIG. (1B) shows the claw lever in a disengaged position while

Figures 1A, 1B:
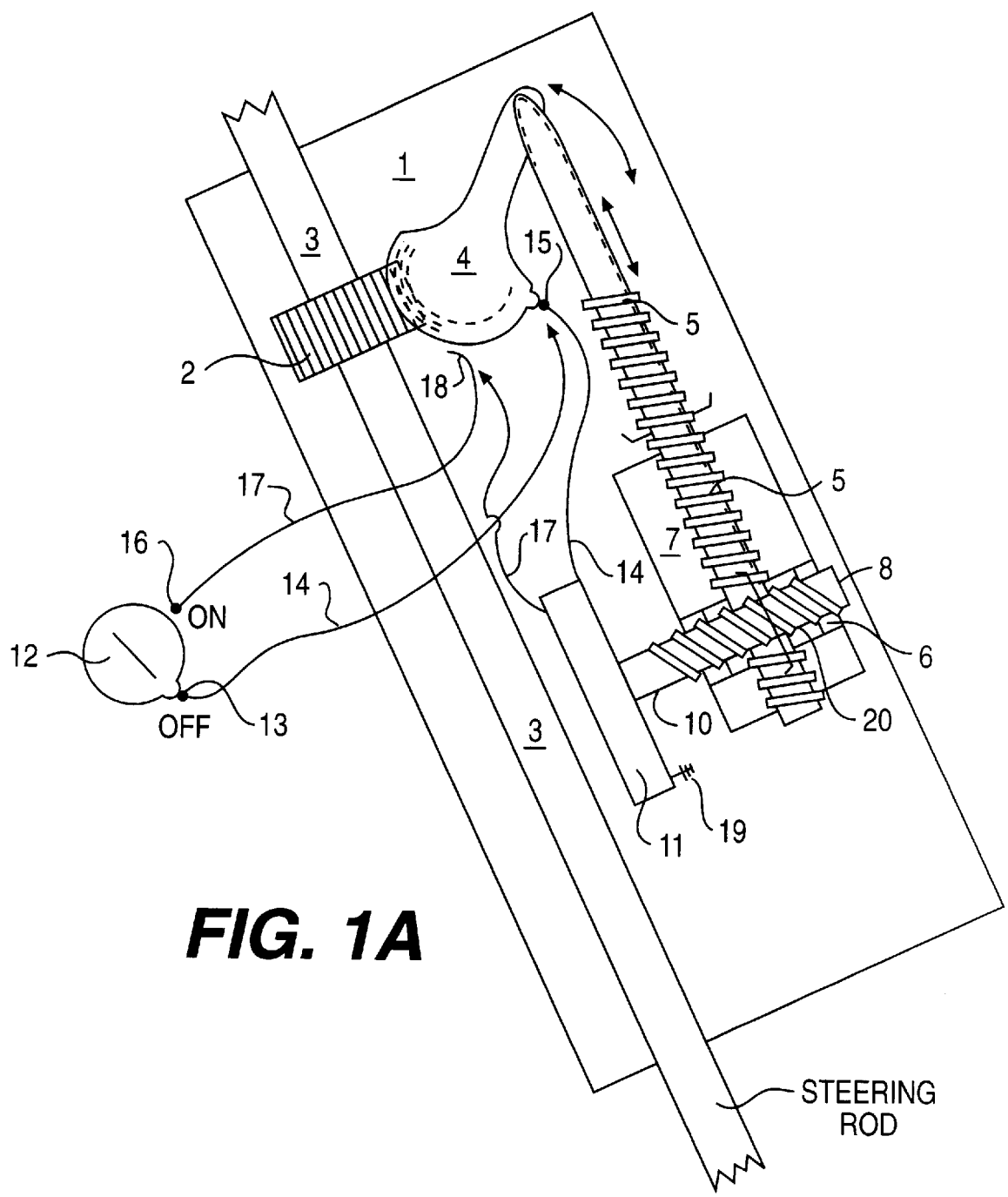
Figure 1C:
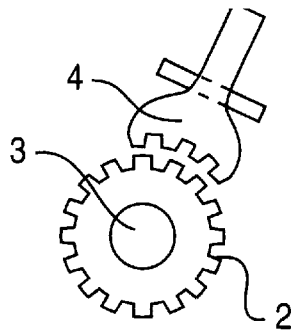
Figure 1D:
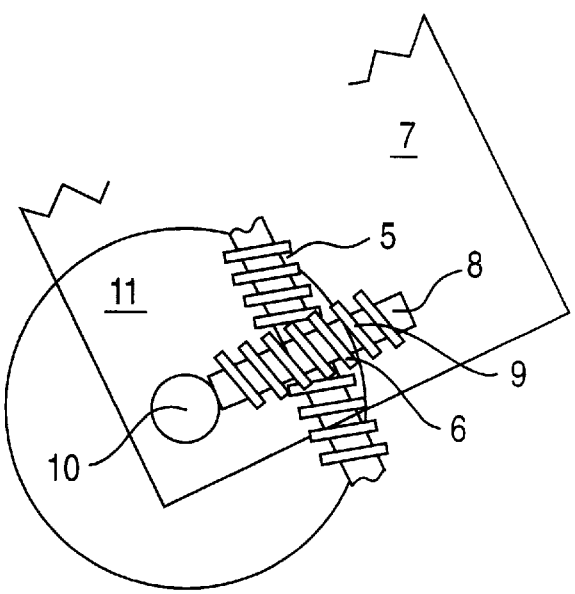
Figure 1E:
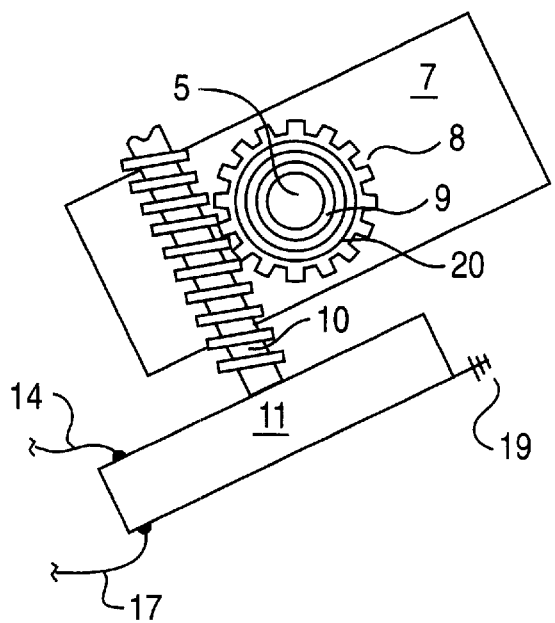

FIG. (1C) shows the claw-lever in the engaged position.

FIGS. (1D) and (1E) show the electric motor and worm gear assembly while

FIG. (1F) shows the rod cross section to emphasize the side grooves which keep the rod from rotating.

FIGS. (2A) and (2B) show the claw lever system using an alternate set of reduction gears.

BRIEF DESCRIPTION OF THE INVENTION

THE FRUSTRATOR MODEL E is a simple small assembly of components consisting of ignition key core contacts, wire conductors, a bi-directional electric motor, a mechanical linkage of gears and a rod, all in common use in various automobile systems, and which on command will control and rotate a unique claw-lever lock which engages a toothed collar on the steering rod to lock the steering rod and render the automobile not derivable. Operation of the assembly is controlled automatically by turning the ignition key to the "off" position to stop the automobile engine and lock the steering rod. Conversely, turning the ignition key to the "on" position to start the automobile engine will energize the electric motor to turn in the opposite direction to disengage the claw-lever lock and permit normal operation of the automobile.

DETAILED DESCRIPTION OF THE INVENTION

Figure 1F:
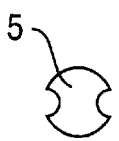
Figure 2A:
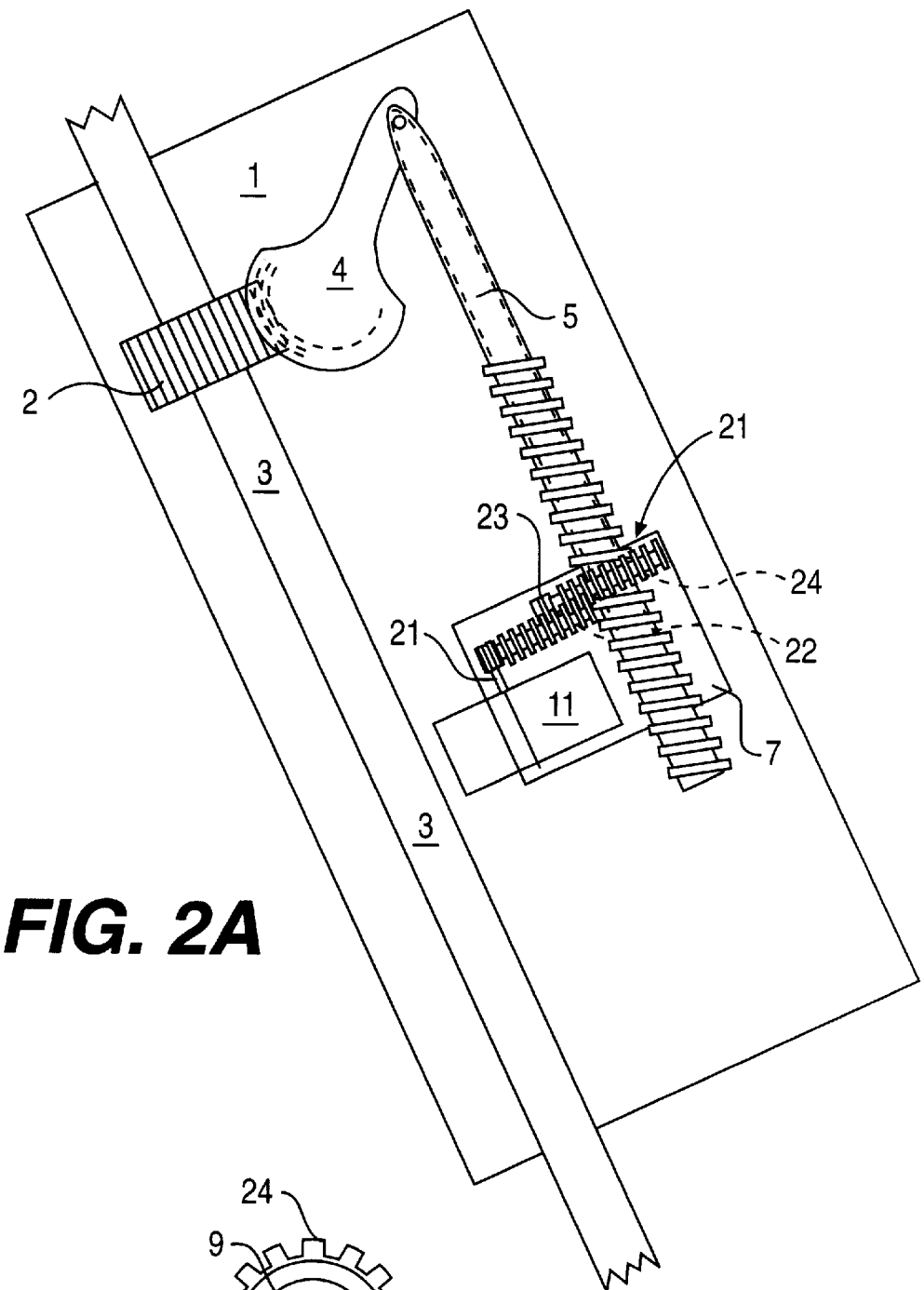
Figure 2B:
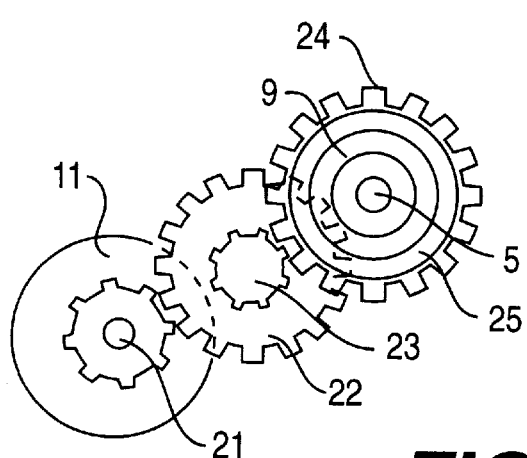

The Frustrator Model E is a simple assembly of components located entirely within the automobile steering column enclosure and consists of the following components:

a. An encompassing frame (1) firmly attached to the steering column enclosure and anchoring the various components;

b. A cylindrical collar with cogs (2) attached to the steering rod (3);

c. A claw-lever (4) with part of one end contoured into a concave shell to mate with said steering rod collar (2). A section of this concave shell is fitted with ridges/cogs to engage the cogs of said collar (2) to lock the steering rod (3) while an adjacent section of this concave shell is smooth to cradle said collar (2) without impeding free rotation of said collar (2) and the steering rod (3). The claw-lever (4) pivots on a center axis to provide rotation to achieve either option in response to the position of the ignition key. The claw lever and center axis must be designed strong enough to withstand any thief s effort to break the steering wheel free;

d. A threaded rod (5) with side grooves (FIG. 1F) links the claw-lever upper end to the worm gear assembly (6) or alternate reduction gear assembly (21–24) to rotate the claw lever in response to the controlling electric motor (11) action;

e. A worm gear assembly (6) consisting of a worm gear wheel (8) fitted with shoulder bearings (20) and a center threaded nut (9) which mates with a threaded rod (5) which extends to and moves the second end of the claw-lever (4), all cradled in bearing sockets anchored in secondary frame (7);

f. A worm gear shaft (10) extending from the axis of the bi-directional electric motor(11) with ground wire (19) and mating with the worm gear wheel (8) and cradled in frame (7);

g. An alternate to the worm gear assembly (6) is a two stage reduction gear linkage (21–24) in which the motor shaft gear wheel (21) mates with a primary reduction gear (22) fitted with a small gear wheel (23) which turns the secondary reduction gear wheel (24) encompassing bearing shoulders (25) and a center nut (9) which mates with the threaded rod (5), all cradled in bearing sockets anchored in the secondary frame (7);

h. A bi-directional electric motor (11) anchored in frame (7) turns the worm gear shaft (10) to rotate the worm gear wheel (8) and center nut (9) to move the threaded rod (5) fore and aft to rotate the claw-lever (4) into either the lock or unlock positions. Alternately, the reduction gear assembly (21–24) will achieve the same effect;

i. The ignition key core (12) has an "off" contact (13) and an "on" contact (16) which energize insulated electric conductors (14) and (17) respectively to energize bi-directional electric motor (11) in one direction or the other direction to activate the worm gear linkage, or alternately the reduction gear linkage, to rotate the claw-lever (4) in the corresponding direction. When the claw-lever has been moved to the lock position, breaker switch (15) will stop the current when the claw-lever reaches a predetermined position. Likewise when the claw-lever has been moved into the unlock position, breaker switch (18) will stop the current when the claw-lever reaches a predetermined position. Electric cable (19) is a ground for said motor.

I claim:

1. A device located within a cage in a steering column enclosure and controlled by an ignition key core, thus making it indiscernible and tamper-proof without dismantling the steering column enclosure comprising:

an ignition key;

a cylindrical collar with cogs attached to a steering rod;

a rotatable claw-lever anchored in said cage and having one end forming a concave shell in which one section has cogs to mate with said cogs on the steering rod collar and another section is smooth to cradle said collar leaving the collar free to rotate;

a bi-directional electric motor controlled by three insulated electric wires and with an extended central shaft;

a gear assembly driven by said bi-directional electric motor shaft;

a rod with one end attached to a second end of said claw-lever and a second end attached to said gear assembly;

a pair of insulated electric wires, each connecting a contact point on an ignition key core and a contact point on said bi-directional electric motor and each passing through a breaker switch to to cut off the electric current when said claw lever reaches predetermined points;

a third electric wire which grounds the said electric motor.

* * * * *